United States Patent [19]

Auman et al.

[11] Patent Number: 5,520,845
[45] Date of Patent: May 28, 1996

[54] POLY(2,6-PIPERAZINEDIONE) ALIGNMENT LAYER FOR LIQUID CRYSTAL DISPLAYS

[75] Inventors: Brian C. Auman, Newark; Melvin P. Zussman, Wilmington, both of Del.; Edgar Bohm, Griesheim, Germany

[73] Assignees: E. I. Du Pont de Nemours and Company, Wilmington, Del.; Merck Patent GmbH, Darmstadt, Germany

[21] Appl. No.: 158,594

[22] Filed: Dec. 2, 1993

[51] Int. Cl.$^6$ .......................... C09K 19/56; C09K 19/00; G02F 1/13; C08G 69/26
[52] U.S. Cl. ..................... 252/299.4; 428/1; 428/473.5; 359/75; 528/353; 252/299.6; 252/299.01
[58] Field of Search ............................. 252/299.4, 299.6, 252/299.01; 359/75; 428/1, 473.55; 528/353

[56] References Cited

U.S. PATENT DOCUMENTS

| | | | |
|---|---|---|---|
| 4,536,564 | 8/1985 | Woo | 528/341 |
| 5,129,727 | 7/1992 | Hanyu et al. | 359/75 |
| 5,135,678 | 8/1992 | Murata et al. | 252/299.4 |
| 5,152,918 | 10/1992 | Murata et al. | 252/299.4 |

FOREIGN PATENT DOCUMENTS

| | | |
|---|---|---|
| 0219336 | 4/1987 | European Pat. Off. . |
| 62-87939 | 4/1987 | Japan . |
| 62-127827 | 6/1987 | Japan . |
| 63-259515 | 10/1988 | Japan . |
| 1-180519 | 7/1989 | Japan . |
| 1-180518 | 7/1989 | Japan . |
| 2-4225 | 1/1990 | Japan . |
| 4110392 | 4/1992 | Japan . |

OTHER PUBLICATIONS

Chemical Abstracts, vol. 74, No. 14, 5 Apr. 1971, Columbus, Ohio, abstract No. 64677m, Y. Iwakura 'Poly[(2,5–dioxo–1, 4–piperazinediyl)arylenes'.

Chemical Abstracts, JP, A 45 020 306 (Asahi Chemicals) 10 Jul. 1990.

Imai, S. and Urayama, K. "Synthesis and Properties of Poly–2,6–Piperazinediones." Kobunshi Kagaku, vol. 29, No. 329 (1972), pp. 610–614.

Imai, Y. "Poly–2,6–piperazinedione." Die Makromolekulare Chemie, vol. 138 (1970), pp. 293–297.

*Primary Examiner*—Cynthia Harris Kelly

[57] ABSTRACT

A poly(2,6-piperazinedione) liquid crystal alignment film providing high voltage holding ratio and high tilt angle when used in active matrix and super twisted nematic liquid crystal displays.

15 Claims, No Drawings

POLY(2,6-PIPERAZINEDIONE) ALIGNMENT LAYER FOR LIQUID CRYSTAL DISPLAYS

FIELD OF THE INVENTION

This invention relates to a novel poly(2,6-piperazinedione) liquid crystal alignment film and to a liquid crystal display device using such a film.

BACKGROUND OF THE INVENTION

Liquid crystal display (LCD) devices have become increasingly important in displays which require very low consumption of electrical power or where the environment dictates a lightweight, planar, flat surface. Thus, LCD's are used in display devices such as wristwatches, pocket and personal computers, aircraft cockpit displays, etc.

In its simplest form, a field effect liquid crystal display device consists of a liquid crystal layer with opposite sides, a set of electrodes on either side of the liquid crystal layer and an alignment polymer layer between each set of electrodes and the liquid crystal layer. Alignment of the liquid crystal molecules occurs at a certain angle, referred to as the tilt angle, with respect to the plane of the inside of two glass plates. The inside of the glass plates is coated with sets of transparent electrodes (electrical conductors), usually indium-tin oxide (ITO). The sets of electrodes are etched into a pattern compatible with the information to be displayed by the LCD. The alignment process is most easily carried out by solution casting (spin coating, roller coating, dipping, spraying, printing and/or doctor blading) an organic polymer onto the two glass/ITO substrates. After removal of solvents and/or curing of the polymer layers, the glass plates are usually rubbed or buffed in one direction with cloths. The rubbing process serves to establish a unique optical direction. After rubbing both plates, they are rotated from 90 to 270 degrees with respect to each other; adhered together using organic adhesives to preserve a constant thickness to a space or gap between the plates; filled with various mixtures of LC substances; and finally sealed using organic adhesives. At this stage, polarizing films are often attached by a lamination process. Finally, electrical connections are made to both plates in a manner consistent with the electrical and display designs.

The use of rubbed polymer films (alignment direction and tilt angle controlling films) dominates the process technology used in the production of all categories of nematic liquid crystal displays, and polyimides are the most common alignment films in use today. Moreover, the polyimide tilt angle and its magnitude are very important in the various electro-optic responses and the electro-optic properties of the LCD device. The stability, legibility and reliability of the LCD are all related to the magnitude of the tilt angle and to the unchanging nature of this magnitude.

Polyimide films used to control the alignment direction and the tilt angle of liquid crystal molecules in all types of liquid crystal displays are very thin, being on the order of 100 to 2000 angstroms. The tilt is induced in a unique direction of the polyimide polymer by gentle buffing with specific cloths. Twisted nematic (TN) LCD's, including active matrix (AM) TN LCD's, such as those used in pocket TV sets and watches, require lower tilt angles in the range of 3 to 5 degrees. Supertwisted nematic (STN) LCD's require higher tilt angles, typically between 5 to 30 and particularly between 5 to 15 degrees. The actual tilt angle obtained is a function of polymer ordering on the surface, the resulting surface energy, the nature of the cloth used to buff the surface and the amount of buffing pressure. In addition to these variables, each of the hundreds of commercial liquid crystal formulations interacts differently with a given surface. In general, however, the single most important factor determining the value range of the tilt angle is the intrinsic character of the polyimide used to control this angle.

Thus, polyimide alignment films for liquid crystal displays must exhibit certain key properties including stable and predictable alignment of liquid crystal molecules and moderate to high tilt angle. In addition, for active matrix displays, the polyimide alignment film must also have a high value of the so-called voltage holding ratio (VHR). The active matrix electrode layer comprises nonlinear addressing elements such as, for example, thin film transistors (TFT), metal-insulator-metal (MIM) diodes or metal-silicon nitride-indium tin oxide (MSI) diodes which are integrated with the image point. Each image point represents a capacitive load with respect to the particular active nonlinear element, which is charged at the rhythm of the addressing cycle. In this cycle, it is of paramount importance that the voltage applied to an addressed image point drops only slightly until the image point is again charged in the next addressing cycle. A quantitative measure of the drop in voltage applied to an image point is the voltage holding ratio (VHR) which is defined as the ratio of the drop in voltage across an image point in the nonaddressed state to the voltage applied. A process for determining the VHR is given, for example, by B. Rieger et al., in Conference Proceeding der Freiburger Arbeitstagung Flussigkristalle (Freiburg Symposium on Liquid Crystals), Freiburg, 1989. Electro-optical systems having a low or relatively low VHR show insufficient contrast.

Currently, aromatic fluorinated polyimides having moderate to high tilt angles are known for use as alignment layers in conventional twisted nematic and more advanced super twisted nematic displays. For example, Japanese Kokai Patent No. 63(1988)-259515, published Oct. 26, 1988, Japanese Kokai Patent No. 1(1989)-180518, published Jul. 18, 1989, and Japanese Kokai Patent No. 1(1989)-180519, published Jul. 18, 1989, disclose LCD device orienting agents, which consist of polyimide resins containing perfluoroalkyl groups containing from 1 to 6 perfluorinated carbon atoms.

Japanese Kokai Patent No. 62(1987)-127827, published Jun. 10, 1987 and Japanese Kokai Patent No. 62(1987)-87939, published Apr. 22, 1987, disclose compositions for liquid crystal oriented films containing a poly(amic acid) or polyimide and at least one of the tetracarboxylic acid or diamine components contains fluorine atoms.

Japanese Kokai Patent No. 2(1990)-4225, published Jan. 9, 1990, discloses a process for preparing a liquid crystal display element comprising heat treating a liquid crystalline orientation film of a polyimide obtained by treating an aromatic tetracarboxylic acid dianhydride with a fluorine-containing diamine in contact with liquid crystals to a temperature at least as high as the liquid transition temperature of said liquid crystal.

For active matrix applications, however, such fluorinated aromatic polyimides suffer from low voltage holding ratio (VHR). The polyimide alignment films of the present invention are based on a unique dianhydride, e.g. ethylenediamine tetraacetic acid dianhydride, and overcome the drawbacks of low VHR of the conventional aromatic polyimide alignment films. The polyimide films of the present invention yield very high voltage holding ratios when used as alignment films for liquid crystal display devices. They also show the ability, when modified with certain comonomers, to give high tilt angles, which are necessary for advanced applications in both active matrix displays (AMD) and super twisted nematic displays (STN).

SUMMARY OF THE INVENTION

In accordance with the present invention, there is provided a polyimide alignment film for liquid crystal display devices, said film comprising poly(2,6-piperazinedione) structural units of the formula

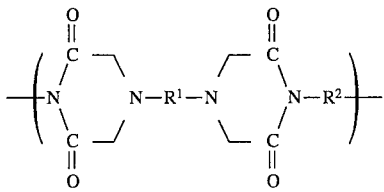

wherein $R^1$ is an alkylene group containing from 1 to 12 carbon atoms wherein up to two carbon atoms can be replaced by —O—, —S—, —CO—, —COO—, —OCO— or —CH=CH—, a 1,4-cyclohexylene group or a 1,4-phenylene group, and $R^2$ is a divalent radical of an aromatic or alicyclic diamine. The alignment film provides a voltage holding ratio of at least 96%, preferably greater than 98%, when used in liquid crystal display devices.

In a preferred embodiment, the polyimide alignment film is adaptable to provide the liquid crystal layer with a constant tilt angle of 3 degrees or more. Particularly preferred polyimides are poly(2,6-piperazinedione)s derived from ethylenediamine tetraacetic acid dianhydride, 4,4'-diaminodiphenyl ether and an effective amount of an aromatic diamine containing pendant alkyl or perfluoroalkyl groups containing more than 6, preferably from 8 to 10, carbon atoms, which provide the liquid crystal layer with a tilt angle of from 3 to 30 degrees.

The present invention also provides a liquid crystal display device comprising a liquid crystal layer with opposite sides, a set of electrodes on either side of the liquid crystal layer, and a layer of said poly(2,6-piperazinedione) polyimide alignment film between each set of electrodes and the liquid crystal layer.

DETAILED DESCRIPTION OF THE INVENTION

The poly(2,6-piperazinedione) polyimides used as alignment films in the liquid crystal display device of the present invention have the following general formula

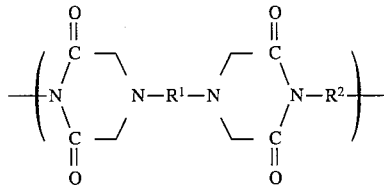

wherein $R^1$ is an alkylene group containing from 1 to 12 carbon atoms wherein up to two carbon atoms can be replaced by —O—, —S—, —CO—, —COO—, —OCO— or —CH=CH—, a 1,4-cyclohexylene group or a 1,4-phenylene group, and $R^2$ is a divalent radical of an aromatic or alicyclic diamine, and are conveniently synthesized by a two-step polymerization and cyclodehydration reaction of a diamine tetraacetic acid dianhydride of the formula

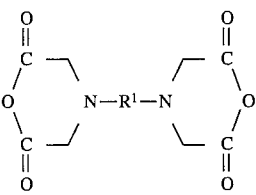

and an aromatic or alicyclic diamine, substantially as described by S. Imai and K. Urayama in Kobunshi Kagaku, Vol. 29, No. 329, pages 610 to 614 (1972).

In the above formula, $R_1$ is a straight-chain or branched chain alkylene group, preferably a straight-chain chain alkylene group containing from 1 to 12 carbon atoms, preferably from 1 to 8, and most preferably from 2 to 4 carbon atoms. Up to two carbon atoms in the R1 chain can optionally be replaced by —O—, —S—, —CO—, —COO—, —OCO— or —CH=CH— groups. $R_1$ can also be a 1,4-cyclohexylene group or a 1,4-phenylene group optionally substituted by F, Cl, Br, alkyl, $CF_3$, Oalkyl groups wherein the alkyl group contains from 1 to 7 carbon atoms.

More specifically, the poly(amic acid) is prepared by solution polymerization of substantially equimolar amounts of the diamine tetraacetic acid dianhydride and the diamine at ambient room temperature to 50° C. in N-methylpyrolidone or N,N-dimethylacetamide solvent The resulting poly(amic acid) solution is subsequently diluted and coated by spin coating or by another of the above mentioned methods onto indium-tin oxide (ITO) coated glass plates and then cured at a temperature of from 150° to 250° C. for from 1 minute to 2 hours to effect dehydration and ring closure of the poly (amic acid) to form a polyimide coating. The polyimide coating is further subjected to a rubbing treatment, which is well-known in the art, to make an alignment controlling film of the invention. The thickness of the alignment film typically ranges from 100 to 1000 angstroms and can be adjusted by varying the amount of polymer to be applied.

A review of conventional alignment controlling techniques is given, for example, by G. W. Gray in Thermotropic Liquid Crystals pages 75 to 77 and by J M. Geary et al. in Journal of Applied Physics, Vol. 62 (10), pages 4100–4108, 1987.

A pair of thus obtained coated glass electrodes and said alignment controlling films are placed in opposition to each other so that their respective alignment films face each other and then are bonded to each other in such a way to form a predetermined space therebetween by interposing spacers between them or by some other means. A conventional liquid crystal composition is filled into said space and then the filling hole is sealed.

Light polarizer layers are deposited on both outside glass surfaces. The directions of polarization of the two polarizers are adjusted with respect to each other, depending on the specific cell configuration. In TN cells, the two directions are usually either substantially perpendicular (normally white cells) or substantially parallel (normally black cells) to each other, while in STN cells, other orientations are also used. The liquid crystals assume a spiral orientation through the thickness of the layer following the alignment of the two alignment layers which have directions substantially perpendicular to each other. Higher twist angles (STN displays) can be realized by adding a suitable doping component to the liquid crystal mixture.

Liquid crystal mixtures that can be used in the liquid crystal displays of the present invention include high holding ratio LC mixtures for active matrix addressed twisted nematic displays which are based on superfluorinated materials (SFM's).

The liquid crystal mixtures used in the LCD's according to the present invention preferably contain at least one compound of formula (I).

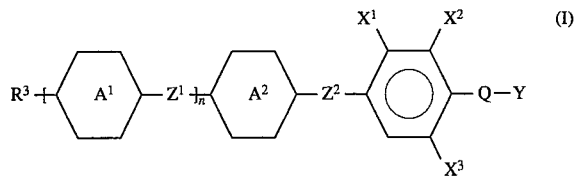

wherein $R^3$ is an alkyl group containing from 1 to 12 carbon atoms wherein, in addition, one or two non-adjacent —$CH_2$— groups can be replaced by —O—, —CO—COO—, —OCO— or —CH=CH—;

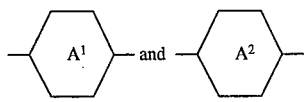

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, or one of

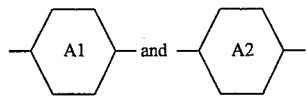

is alternatively pyrimidine-2,5-diyl, pyridine-2,5-diyl or trans-1,4-dioxane-2,5-diyl;

$Z_1$ and $Z_2$, independently of one another, are a direct bond, —$CH_2CH_2$—, —COO—, —OCO— or —C≡C—;

$X^1$, $X^2$ and $X^3$, independently of one another, are H or F;

Q is —$CF_2$—, —$OCF_2$—, —$C_2F_4$— or a direct bond;

Y is H, F, Cl or CN; and n is 0, 1 or 2.

The proportion of one or more compounds of the formula (I) in the liquid crystal mixtures used according to the invention is preferably more than 15% by weight and, more particularly, more than 20% by weight. Liquid crystal mixtures containing more than 40% by weight and particularly more than 50% by weight of one or more compounds of the formula (I) are particularly preferred.

The liquid crystal mixtures used according to the invention can contain further components which are preferably selected from nematic or nematogenic (monotropic or isotropic) substances, in particular substances selected from the group consisting of azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl benzoates, cyclohexylphenyl cyclohexanecarboxylate, cyclohexylphenyl cyclohexylcyclohexanecarboxylate, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis(cyclohexyl)benzenes, 4,4'-bis(cyclohexyl)biphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compounds can also be fluorinated.

The liquid crystal mixtures used in the electro-optical systems according to the invention may also contain one or more dielectrically neutral compounds having formulas (II) to (V).

In the formulas (II) and (III) above, L and E may be identical or different and are each, independently of one another, a divalent radical selected from the group consisting of -Phe-, -Cyc-, -Phe-Phe-, -Phe-Cyc-, -Cyc-Cyc-, -Pyr-, -Dio-, -G-Phe- and -G-Cyc- and mirror images thereof. Phe is unsubstituted or fluorine substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl and G is 2-(trans(-1,4-cyclohexyl)ethyl, pyrimidine-2,5-diyl, pyridine-2,5-diyl or 1,3-dioxane-2,5-diyl. One of the radicals L and E is preferably Cyc, Phe or Pyr. E is preferably Cyc, Phe or Phe-Cyc.

The liquid cyrstals used in the invention preferably contain one or more components selected from compounds of formulas (II) and (III), wherein L and E are selected from the group consisting of Cyc, Phe and Pyr and simultaneously one or more components are selected from the compounds of formulas (II) and (III), wherein one of the radicals L and E is selected from the group comprising Cyc, Phe and Pyr and the other radical is selected from the group consisting of -Phe-Phe-, -Phe-Cyc-, -Cyc-Cyc-, -G-Phe- and -G-Cyc-, and, if desired, one or more components are selected from the compounds of formulas (II) and (III), wherein the radicals L and E are selected from the group consisting of -Phe-Cyc-, -Cyc-Cyc-, -G-Phe- and -G-Cyc-.

$R^4$ and $R^5$ in the compounds of formulas (II) and (III) are each, independently of one another, preferably alkyl, alkenyl, alkoxy, aklenyloxy or alkanoyloxy having up to 8 carbon atoms. In most of these compounds, $R^4$ and $R^5$ are different from one another, one of $R^4$ and $R^5$ being in particular alkyl, alkoxy or alkenyl.

Especially preferred is the following group of dielectrically neutral compounds of formulas (IV) and (V).

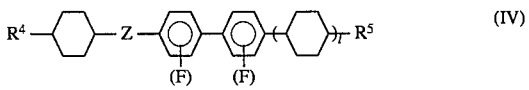

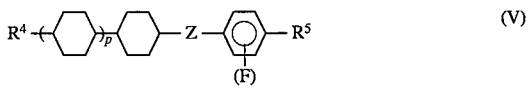

wherein $R^4$ and $R^5$ are the same as described for formulas (II) and (III),

Z is a direct bond or —$CH_2CH_2$—, l and p, independently from each other, are 0 or 1, and

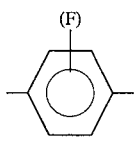

is 1,4-phenylene, 2-fluoro-1,4-phenylene or 3-fluoro-1,4-phenylene.

The weight proportion of the compounds of formulas (II) to (V) used in the liquid crystal mixtures according to the invention is preferably from 0 to 50% by weight and, in particular, from 0 to 40% by weight.

Liquid crystal compounds according to formula (I) wherein Y is H, F or Cl are defined as SFM materials while compounds with Y=CN are defined as carbonitrile compounds. LCD's according to the present invention, which are addressed by an active matrix, preferably contain liquid crystal mixtures which are based on SFM compounds. Especially preferred are actively addressed LCD's, wherein the liquid crystal mixture contains at least 40% by weight and, most preferably, not less than 60% by weight of one or more compounds according to formula (I) wherein Y=H, F or Cl. The liquid crystal mixture of actively addressed LCD's according to the present invention preferably contains less than 20% by weight of carbonitrile compounds, especially less than 10% by weight of carbonitrile compounds and, most preferably, no carbonitrile compounds.

LCD's which are not addressed by an active matrix preferably contain a component of one or more carbonitrile compounds. This is especially true for STN displays which can be driven by a passive or by the so-called active multiplex addressing scheme. The percentage of the carbonitrile component with respect to the weight of the liquid crystal mixture for LCD's which are not addressed by an active matrix is preferably at least 10% by weight and specifically not less than 25% by weight. Especially preferred are liquid crystal mixtures containing at least 20% by weight of one or more compounds of formula (I) wherein Y is CN. The liquid crystal mixture of not actively addressed displays preferably contains at least 30% by weight of carbonitrile compounds and has a complex composition of at least 6 and especially at least 7 liquid crystalline compounds. In another specifically preferred embodiment, the liquid crystal mixture contains at least 15% by weight of at least one 2-ring and at least one 3-ring carbonitrile compound according to formula (I) with the ratio of the percentages of 3- and 4-ring compounds to 2-ring compounds being at least 0.18.

The liquid-crystal compounds of formula (I) and compounds of formulas (II) to (V) are known, and are prepared by methods known per se, for example, as described in Houben-Weyl, Methoden der Organischen Chemie [Methods of Organic Chemistry], Stuttgart, Germany.

Specific liquid crystal mixtures used in the present invention include superfluorinated materials which are disclosed, for example, in U.S. Pat. No. 4,302,352, U.S. Pat. No. 4,330,426, WO 89-02,884, WO 91-08,184 and WO 91-03,450.

Preferred LC mixtures of the types described above, are commercially available from E. Merck, Darmstadt, Germany under the trademark Licristal®.

Specific examples of the diamine to be used in the liquid crystal aligning film of the present invention, designated as $R^2$ in the previous formula, include aromatic diamines such as p-phenylenediamine, m-phenylenediamine, 4,4'-diaminodiphenylmethane, 4,4'-diaminodiphenyl ether, 3,4'-diaminodiphenyl ether, 2,2-bis(4-aminophenyl)propane, 2,2-bis(4-aminophenyl)hexafluoropropane, 4,4'-diaminodiphenylsulfone, 4,4'-diaminobenzophenone, m-xylenediamine, p-xylenediamine, 1,3-bis(4-aminophenoxy)-benzene, 1,4-bis(4-aminophenoxy)benzene, 2,2-bis(4-(4-aminophenoxy)phenyl)propane, 2,2-bis(4-(4-aminophenoxy)-phenyl)hexafluoropropane, 4,4'-bis(4-aminophenoxy)-diphenylsulfone, 4,4'-diaminobenzanilide, benzidine, 1,5-diaminonaphthalene, 3,3'-dimethylbenzidine and 3,3'-dimethoxybenzidine.

Specific examples of the alicyclic diamine include 1,4-diaminocyclohexane, 1,3-diaminocyclohexane, 4,4'-diaminodicyclohexylmethane, 4,4'-diamino-3,3'-dimethyldicyclohexylmethane, 4,4'-diaminodicyclohexylsulfone and 4,4'-diaminodicyclohexyl ether.

A particularly preferred liquid crystal aligning film of the invention comprises a polyimide derived from ethylene diamine tetraacetic acid dianhydride and 4,4'-diaminodiphenyl ether, which was a very high voltage holding ratio of greater than 99% (measured after 5 minutes at 100° C.) and a low tilt angle ranging from 1 to 3 degrees required in twisted nematic LCD's.

In a particularly preferred embodiment, the polyimide liquid crystal aligning film can be modified with from 1 to 10 mole %, particularly from 1 to 7 mole %, based on the total molar amount of diamines present, of certain diamine comonomers to give higher tilt angles ranging from 3 to 30 degrees required to align super twisted nematic (STN) and active matrix displays (AMD).

Suitable diamine comonomers include aromatic diamines and aliphatic monoamines containing at least one linear or branched alkyl or perfluoroalkyl group containing from 6 to 22, preferably from 8 to 10, carbon atoms. If the number of carbon atoms is less than 6, the enhancement of the tilt angle is not generally satisfactory.

The use of fluorinated carbon atom chains, herein abbreviated as RfX (where Rf stands for the perfluoroalkyl chain and X refers to the number of perfluorinated carbon atoms within the chain), attached directly to the cyclic aromatic diamine ring, i.e., Ar—RfX, without any intervening atoms provides the highest degree of thermal stability, together with high tilt angle, and is preferred. In other cases, the RfX group can be attached in very close proximity to the aromatic diamine ring through intervening atoms such as Ar—O—CH$_2$—RfX, Ar—CH$_2$O—(CH$_2$)$_{1-6}$—RfX, Ar—C(CH$_3$)$_2$—RfX, Ar—COO (CH$_2$)$_2$—RfX, Ar—CO—RfX and Ar—CONH—RfX, while still retaining the requisite thermal stability.

Specific examples of alkyl and perfluoroalkyl group containing aromatic diamine and aliphatic monoamine comonomers include 5-perfluorohexyl-1,3-phenylene diamine, 5-perfluorooctyl-1,3-phenylene diamine, 5-perfluorodecyl-1,3-phenylene diamine, 2-perfluorohexyl-4,6-diaminomesitylene, 2-perfluorooctyl-4,6-diaminomesitylene, 1-[2,2-bis-(trifluoromethyl)-3,3,4,4,5,5,5-heptafluoropentyl]-3,5-diaminobenzene, 4-(1,1,11-trihydroperfluoroundecyloxy)-1,3-phenylene diamine, 3,5-diamino-1H,1H,2H,2H-heptafluorodecylbenzoate, 3,5-diaminodecylbenzoate, 3,5-diaminohexadecylbenzoate, 1-amino-3-perfluorohexyl propane and 1-amino-3-perfluorodecyl propane.

The tilt angle of a liquid crystal can be stably controlled in a range of from 1 to 30 degrees or higher by varying the molar amount of diamine or monoamine comonomer used in the polymerization of the polyimide. The content of the comonomer preferably ranges from 1 to 7 mole %, based on the total molar amount of diamines used in the polyimide.

A particularly preferred poly(2,6-piperazinedione) alignment film of the invention comprises the reaction product of ethylenediamine tetraacetic acid dianhydride (EDDA), from 93 to 99 mole % of 4,4'-diaminodiphenyl ether (ODA) and from 1 to 7 mole % of 5-perfluorooctyl-1,3-phenylenediamine (Rf8MPD) or 5-perfluorodecyl-1,3-phenylene diamine (Rf10MPD).

Table I shows both the voltage holding ratio (VHR) and tilt angles of EDDA/ODA polyimides containing various molar amounts of RfnMPD. The voltage holding ratios are generally excellent, with some decrease with increasing levels of Rf8MPD. Very high tilt angles were also obtained, even at relatively low levels of Rf8MPD. An EDDA/ODA polyimide composition containing about 2 mole % of Rf8MPD has a tilt angle of 3.1 degrees and a VHR of 99.1% at 100° C. making it highly desirable for use in advanced active matrix liquid crystal displays. Increasing the length of the RfX group (Rf10MPD) or changing the polymerization solvent from N-methylpyrrolidone (NMP) to N,N-dimethylacetamide (DMAC) provides even higher tilt angles of up to 26 degrees and above for application in super twisted nematic LCD's.

The observed solvent effect is believed to be due to a change in the kinetics of imidization and a corresponding change in the arrangement and concentration of fluoroalkyl groups at the surface of the film.

TABLE I

ALIGNMENT LAYERS
BASED ON EDDA/ODA POLYPIPERAZINEDIONE

| Mole %* RfnMPD/Solvent | Tilt angle (°) with ZLI-4792 (Liq. Crystal) | VHR (% at 100° C., 5 min) |
|---|---|---|
| O/NMP | 0.9 | 99.3 |
| 1 Rf8MPD/NMP | 1.8 | 99.5 |
| 2 Rf8MPD/NMP | 3.1 | 99.1 |
| 3 Rf8MPD/NMP | 6.7 | 98.6 |
| 4 Rf8MPD/NMP | 9.7 | 98.1 |
| 7 Rf8MPD/NMP | 15.1 | 96.5 |
| 7 Rf8MPD/DMAC | 26 | 96.8 |
| 7 Rf10MPD/NMP | 26 | 98.9 |

*Based on 100 mole % total diamine
n = number of carbon atoms in perfluoroalkyl chain The present invention will be explained in more detail by way of the following examples which, however, do not in any way restrict the scope of the present invention.
EDDA=ethylenediamine tetraacetic acid dianhydride
ODA =4,4'-oxydianiline (4,4'-diaminodiphenyl ether)
MPD=m-phenylenediamine
BAPP=2,2-bis(4-(4-aminophenoxy)phenyl)propane
BDAF=2,2-bis(4-(4-aminophenoxy)phenyl)hexafluoropropane
PACM-20=Bis(p-aminocyclohexyl)methane (Air Products Co., mixture of cis/trans isomers)
Rf8MPD=5-perfluorooctyl-1,3-phenylene diamine
Rf10MPD=5-perfluorodecyl-1,3-phenylene diamine
Rhf8DAB=3,5-diamino-1H,1H,2H, 2H-heptafluorodecylbenzoate
Rh10DAB=3,5-diaminodecylbenzoate
Rh16DAB=3,5-diaminohexadecylbenzoate
Rhf6MA=1-amino-3-perfluorohexyl propane
Rhf10MA=1-amino-3-perfluorodecyl propane
DMAC=N,N-dimethylacetamide
NMP=N-methylpyrrolidone
ITO=indium/tin oxide
HF=hydrofluoric acid
MPa=megapascal
GPa=gigapascal
nm=nanometer
KHz=kilohertz

| Properties | Liquid Crystal Mixtures | | | | |
|---|---|---|---|---|---|
| | ZLI-4792 | ZLI-5081 | MLC6008 | ZLI-2293 | ZLI-4277 |
| clearing point [°C.] | 92 | 99 | 85 | 85 | 91 |
| dielectric anisotrophy (1 kHz, 20° C.) | 5.2 | 6.8 | 9.4 | 10.0 | 5.6 |
| optical anisotropy (20° C., 589 nm) | 0.0969 | 0.0960 | 0.0911 | 0.1322 | 0.1178 |

ZLI-4792, ZLI-5081, MLC6008, ZLI-2293 and ZLI-4277 were obtained from E. Merck, Darmstadt, Germany.

EXAMPLE 1

Poly(amic acid) of EDDA and ODA

Into a 1 liter reaction flask equipped with a mechanical stirrer, nitrogen inlet and reflux condenser with nitrogen outlet were charged 100 g of N,N,N'N'-ethylenediamine tetraacetic acid (EDTA, Aldrich Chemical Co.), 132 ml of acetic anhydride and 169 ml of pyridine. The mixture was heated to 65° C. under a slight nitrogen flow and allowed to react for 24 hours. After overnight reaction, the reaction mixture (a slurry) had developed an orange coloration. The solid was filtered off using a ceramic frit filter under a nitrogen blanket. The solid was then washed twice with two 50 ml portions of acetic anhydride resulting in a white/off-white solid which was dried thoroughly in a vacuum oven with nitrogen bleed at 70° C. Proton NMR spectroscopy (dmso-d6) indicated complete conversion of the tetraacid to dianhydride: 2.65 ppm (s, 1H), 3.7 ppm (s, 2H).

Into a 100 ml reaction flask equipped with a mechanical stirrer and nitrogen inlet and outlet were charged 4.3868 g (0.021908 mole) ODA along with 36 ml NMP. After dissolution of the diamine, 5.6132 g (0.021908 mole) of EDDA powder were added and rinsed in with 4 ml NMP (40 ml NMP total). The reaction was allowed to stir overnight at room temperature under nitrogen. A viscous, light yellow poly(amic acid) solution resulted which exhibited a Mw of 151,000 by GPC (IR detection, polystyrene standards). This poly(amic acid) solution (PAA) was then diluted to 3.5% solids with NMP (viscosity 24 cps, film thickness 410 angstroms at 3000 RPM spin speed). The diluted PAA solution was spin coated onto 7"×7" ITO coated glass plates. The PAA coated glass plates were then placed on a hot plate at 100° C. for 1 minute, followed by curing in an air oven at 180° C. for 1.5 hours. The cured film was then buffed twice unidirectionally with a rayon cloth (YOSHIKAWA YA20R) on a rubbing machine (KETEK, Inc.) using the following conditions: radius of rubbing wheel=50 mm, rotation speed=190 rpm, translation speed of glass plate=25 mm/second, pile impression=0.3 mm.

For tilt angle measurements, the coated glass plates were assembled so that their respective rubbing directions were anti-parallel to each other. The spacing between the glass plates was set at 50 micrometers by incorporation of glass fibers into a UV curable adhesive placed around the perimeter of the plates, followed by curing of the adhesive. One or two small gaps in the adhesive were left to allow filling of the cell. The liquid crystal mixture was filled into the gap between the plates via capillary action with or without support of a vacuum. The completed cell was placed in an oven at 120° C. for 5 minutes to allow for complete isotropization of the LC mixture. The test cells were then cooled and stored at RT for 12 hours prior to measurement of the tilt angle.

For voltage holding ratio measurements, the coated glass plates were assembled so that their respective rubbing directions were perpendicular to each other. The spacing between the glass plates was set at 6 micrometers by incorporation of glass fibers into an adhesive around the perimeter of the plates, followed by curing of the adhesive. Two small filling holes were left to allow filling of the cell. The liquid crystal mixture was filled into the gap between the plates via capillary action. The active area (area coated with ITO) was 1 cm$^2$.

Tilt angle measurements were performed using the crystal rotation method, as described by G. Baur et al, Physics Letters, Vol. 56A, No. 2, pages 142–144, 1976. Voltage holding ratio measurements were performed using an Autronic Melchers VHRM 100 (Karlsruhe, Germany). The measurement conditions were ±1 volt, 60 Hz refresh rate, 64 microseconds pulse duration, 30 meas./cycle. The method is described in detail by T. Jacob et al, Physical Properties of Liquid Crystals VIII. Voltage Holding Ratio, Merck Group Liquid Crystal Newsletter No. 9, Darmstadt, Germany, October, 1992.

The liquid crystal test cell containing this material as alignment layer and ZLI-4792 (E. Merck, Co.) as liquid crystal mixture exhibited a tilt angle of 0.9 degrees and had a high voltage holding ratio (after 5 minutes at 100° C.) of 99.3%.

EXAMPLE 2

Poly(amic acid) of EDDA and ODA and Mechanical Properties of the Polyimide Film

In a similar manner to Example 1, a poly(amic acid) was prepared from similar quantities of ODA and EDDA. The viscous poly(amic acid) solution exhibited a Mw of 240,000 by GPC (UV detection 1280 nm, polystyrene standards). It was pressure-filtered through a 15 micron filter and then spin coated onto a silicon wafer. The coating was dried at 135° C. for 30 minutes in air and then cured at 180° C. for 1 hour under nitrogen. Etching of the wafer in dilute aqueous HF released the film from the wafer. A 9.7 micron film resulted which had the following mechanical properties when measured on an Instron 4501 instrument according to ASTM D-882-83 (Method A): tensile strength at break=72 MPa, Young's modulus=2.2 GPa and elongation at break=111%. Thermogravimetric analysis (TGA, conditions were 10 minutes at 125° C. then run at 15 degrees/minute, RT to 600° C.) gave 5% and 10% weight loss at temperatures of 273° C. and 330° C., respectively, in air; and 5% and 10% weight loss at temperatures of 268° C. and 337° C., respectively, in nitrogen.

EXAMPLE 3

Poly(amic acid) of EDDA. ODA and Rf8MPD (100//93/7 molar ratio)

In a similar manner as in Example 1, a poly(amic acid) was prepared from 7.7709 g (0.038879 mole) ODA, 1.5372 g (0.0029214 mole) of Rf8MPD and 10.6919 g (0.0417294 mole) of EDDA. A moderately viscous, yellow poly(amic acid) solution resulted, which exhibited a Mw of 148,000 by GPC (UV detection, polystyrene standards). This poly(amic acid) solution was then diluted to 4% solids with NMP (viscosity 14 cps, film thickness 470 angstroms at 2000 RPM spin speed).

The liquid crystal test cell containing this material as alignment layer and ZLI-4792 as liquid crystal mixture exhibited a tilt angle of 15.1 degrees and had a high voltage holding ratio (after 5 minutes at 100° C.) of 96.5%.

EXAMPLE 4

Poly(amic acid) of EDDA; ODA and Rf8MPD (100//96/4 molar ratio) 35 In a similar manner as in Example 1, a poly(amic acid) was prepared from 8.1887 g (0.0408944 mole) ODA, 0.8967 g (0.0017041 mole) of Rf8MPD and 10.9164 g (0.0425985 mole) of EDDA. A moderately viscous, yellow poly(amic acid) solution resulted, which exhibited a Mw of 192,000 by GPC (UV detection, polystyrene standards). This poly(amic acid) solution was then diluted to 4% solids with NMP (viscosity 16 cps, film thickness 330 angstroms at 3000 RPM spin speed).

The liquid crystal test cell containing this material as alignment layer and ZLI-4792 as liquid crystal mixture exhibited a tilt angle of 9.7 degrees and had a high voltage holding ratio (after 5 minutes at 100° C.) of 98.1%. With ZLI-2293 (E. Merck, Co.) as liquid crystal mixture the tilt angle was 18 degrees.

EXAMPLE 5

Poly(amic acid) of EDDA, ODA and Rf8MPD (100//97/3 molar ratio)

In a similar manner as in Example 1, a poly(amic acid) was prepared from 8.3319 g (0.0416096 mole) ODA, 0.6771 g (0.0012868 mole) of Rf8MPD and 10.9909 g (0.0428964 mole) of EDDA. A moderately viscous, yellow poly(amic acid) solution resulted, which exhibited a Mw of 184,000 by GPC (UV detection, polystyrene standards). This poly(amic acid) solution was then diluted to 4% solids with NMP (viscosity 16 cps, film thickness 360 angstroms at 3000 RPM spin speed).

The liquid crystal test cell containing this material as alignment layer and ZLI-4792 as liquid crystal mixture exhibited a tilt angle of 6.7 degrees and had a high voltage holding ratio (after 5 minutes at 100° C.) of 98.6%.

EXAMPLE 6

Poly(amic acid) of EDDA, ODA and Rf8MPD (100//98/2 molar ratio)

In a similar manner as in Example 1, a poly(amic acid) was prepared from 8.4471 g (0.0423347 mole) ODA, 0.4545 g (0.0008638 mole) of Rf8MPD, and 11.0683 g (0.0428964 mole) of EDDA. A viscous, light amber poly(amic acid) solution resulted, which exhibited a Mw of 222,000 by GPC (UV detection, polystyrene standards). This poly(amic acid) solution was then diluted to 4% solids with NMP (viscosity 18 cps, film thickness 340 angstroms at 3000 RPM spin speed).

The liquid crystal test cell containing this material as alignment layer and ZLI-4792 as liquid crystal mixture exhibited a tilt angle of 3.1 degrees and had a high voltage holding ratio (after 5 minutes at 100 ° C.) of 99.1%. With ZLI-2293, ZLI-4277, MLC-6008, or ZLI-5081 (E. Merck, Darmstadt) as liquid crystal mixture, the tilt angles were 11.3, 5, 7, 4.1 and 6.4 degrees, respectively.

EXAMPLE 7

Poly(amic acid) of EDDA, ODA and Rf8MPD (100//99/1 molar ratio)

In a similar manner as in Example 1, a poly(amic acid) was prepared from 8.6243 g (0.0430698 mole) ODA, 0.2289 g (0.0004350 mole) of Rf8MPD, and 11.1468 g (0.0435048 mole) of EDDA. A viscous, light amber poly(amic acid) solution resulted, which exhibited a Mw of 278,000 by GPC (UV detection, polystyrene standards). This poly(amic acid) solution was then diluted to 4% solids with NMP (viscosity 30 cps, film thickness 470 angstroms at 3000 RPM spin speed).

The liquid crystal test cell containing this material as alignment layer and ZLI-4792 as liquid crystal mixture exhibited a tilt angle of 1.8 degrees and had a high voltage holding ratio (after 5 minutes at 100° C.) of 99.5%. With ZLI-2293 as liquid crystal mixture, the tilt angle was 4.1 degrees.

EXAMPLE 8

Poly(amic acid) of EDDA, ODA and Rf8MPD (100//93/7 molar ratio)

In a similar manner as in Example 1 and with equivalent quantities of reactants as in Example 3, a poly(amic acid) was prepared in DMAC instead of NMP. A moderately viscous, yellow poly(amic acid) solution resulted, which exhibited a Mw of 217,000 by GPC (UV detection, polystyrene standards). This poly(amic acid) solution was then diluted to 4% solids with DMAC (viscosity 10 cps, film thickness 520 angstroms at 3000 RPM spin speed).

The liquid crystal test cell containing this material as alignment layer and ZLI-4792 as liquid crystal mixture exhibited a tilt angle of 26 degrees and had a high voltage holding ratio (after 5 minutes at 100° C.) of 96.8%.

EXAMPLE 9

Poly(amic acid) of EDDA. ODA and Rf10MPD (100//93/7 molar ratio)

In a similar manner as in Example 1, a poly(amic acid) was prepared from 7.6591 g (0.0382496 mole) ODA, 1.8029 g (0.0028791 mole) of Rf10MPD, and 10.5380 g (0.0411287 mole) of EDDA. A moderately viscous, orange-yellow poly(amic acid solution resulted, which exhibited a Mw of 187,000 by GPC (UV detection, polystyrene standards). This poly(amic acid) solution was then diluted to 4% solids with NMP (viscosity 16 cps, film thickness 325 angstroms at 3000 RPM spin speed).

The liquid crystal test cell containing this material as alignment layer and ZLI-4792 as liquid crystal mixture exhibited a tilt angle of 26 degrees and had a high voltage holding ratio (after 5 minutes at 100° C.) of 98.9%.

EXAMPLE 10

Poly(amic acid) of EDDA, ODA and Rh10DAB (100//96/4 molar ratio)

In a similar manner as in Example 1, a poly(amic acid) was prepared from 4.1776 g (0.020863 mole) ODA, 0.2541 g (0.000869 mole) of Rh10DAB and 5.5682 g (0.0217321 mole) of EDDA. A viscous, slightly hazy, yellow poly(amic acid) solution resulted, which exhibited a Mw of 232,000 by GPC (UV detection, polystyrene standards). This poly(amic acid) solution was then diluted to 4% solids with NMP (viscosity 26 cps, film thickness 490 angstroms at 3000 RPM spin speed).

The liquid crystal test cell containing this material as alignment layer and ZLI-4792 as liquid crystal mixture exhibited a voltage holding ratio (after 5 minutes at 100° C.) of 99.1% and had a tilt angle of 1.8 degrees.

EXAMPLE 11

Poly(amic acid) of EDDA, ODA and Rh16DAB (100//96/4 molar ratio)

In a similar manner as in Example 1, a poly(amic acid) was prepared from 4.1473 g (0.0207116 mole) ODA, 0.3250 g (0.000863 mole) of Rh16DAB, and 5.5278 g (0.0215744 mole) of EDDA. A viscous, light yellow poly(amic acid) solution resulted, which exhibited a Mw of 333,000 by GPC (UV detection, polystyrene standards). This poly(amic acid) solution was then diluted to 3.7% solids with NMP (viscosity 30 cps, film thickness 560 angstroms at 3000 RPM spin speed).

The liquid crystal test cell containing this material as alignment layer and ZLI-4792 as liquid crystal mixture exhibited a voltage holding ratio (after 5 minutes at 100° C.) of 99.3% and had a tilt angle of 3.0 degrees.

EXAMPLE 12

Poly(amic acid) of EDDA, ODA and Rhf8DAB (100//98/2 molar ratio)

In a similar manner as in Example 1, a poly(amic acid) was prepared from 4.2254 g (0.0211017 mole) ODA, 0.2574 g (0.0004302 mole) of Rhf8DAB, and 5.5169 g (0.0215319 mole) of EDDA. A viscous, light yellow poly(amic acid) solution resulted, which exhibited a Mw of 259,000 by GPC (UV detection, polystyrene standards). This poly(amic acid) solution was then diluted to 3.7% solids with NMP (viscosity 24 cps, film thickness 435 angstroms at 3000 RPM spin speed).

The liquid crystal test cell containing this material as alignment layer and ZLI-4792 as liquid crystal mixture exhibited a voltage holding ratio (after 5 minutes at 100° C.) of 98.4% and had a tilt angle of 4.2 degrees.

EXAMPLE 13

Poly(amic acid) of EDDA, ODA and Rhf10MA (100//99/2 molar ratio)

In a similar manner as in Example 1, a poly(amic acid) was prepared from 4.2540 g (0.0212445 mole) ODA, 0.2477 g (0.0004292 mole) of Rhf10MA, and 5.4983 g (0.0214593 mole) of EDDA. The Rhf10MA was predissolved in 5 ml NMP (with warming) prior to combining with the ODA in NMP solution. A moderately viscous, hazy, pale yellow poly(amic acid) solution resulted, which was then diluted to 4% solids with NMP (viscosity 14 cps, film thickness 360 angstroms at 3000 RPM spin speed).

The liquid crystal test cell containing this material as alignment layer and ZLI-4792 as liquid crystal mixture exhibited a tilt angle of 3.5 degrees and a voltage holding ratio (after 5 minutes at 100° C.) of 98.7%.

EXAMPLE 14

Poly(amic acid) of EDDA, ODA and Rhf6MA (100//98/2 molar ratio)

In a similar manner as in Example 1, a poly(amic acid) was prepared from 4.2908 g (0.0214283 mole) ODA, 0.1633 g (0.0004330 mole) of Rhf6MA, and 5.5459 g (0.0216451 mole) of EDDA. A moderately viscous, hazy, pale yellow poly(amic acid) solution resulted, which was diluted to 4% solids with NMP.

EXAMPLE 15

Poly(amic acid) of EDDA and MPD

In a similar manner as in Example 1, a poly(amic acid) was prepared from 2.96796 g (0.0274454 mole) MPD and 7.0321 g (0.0274454 moles) of EDDA. A viscous, orange-amber poly(amic acid) solution resulted, which exhibited a Mw of 118,000 by GPC (UV detection, polystyrene standards). This poly(amic acid) solution was then diluted to 4% solids with NMP (viscosity 12 cps, film thickness 315 angstroms at 3000 RPM spin speed).

EXAMPLE 16

Poly(amic acid) of EDDA, MPD and Rf8MPD (100//97/3 molar ratio)

In a similar manner as in Example 1, a poly(amic acid) was prepared from 2.8433 g (0.0262928 mole) MPD, 0.2824 g (0.0005367 mole) of Rf8MPD and 6.8743 g (0.0268297 mole) of EDDA. A viscous, orange-pink poly(amic acid) solution resulted, which exhibited a Mw of 112,000 by GPC (UV detection, polystyrene standards). This poly(amic acid) solution was then diluted to 3.7% solids with NMP (viscosity 14 cps, film thickness 315 angstroms at 3000 RPM spin speed).

The liquid crystal test cell containing this material as alignment layer and ZLI-4792 as liquid crystal mixture exhibited a voltage holding ratio (after 5 minutes at 100° C.) of 99.1% and had a tilt angle of 3.3 degrees.

EXAMPLE 17

Poly(amic acid) of EDDA, BDAF and Rf8MPD (100//98/2 molar ratio)

In a similar manner as in Example 1, a poly(amic acid) was prepared from 6.5555 g (0.0126544 mole) BDAF, 0.1359 g (0.0002583 mole) of Rf8MPD, and 3.3085 g (0.0129127 mole) of EDDA. A moderately viscous, orange-amber poly(amic acid) solution resulted, which exhibited a Mw of 234,000 by GPC (UV detection, polystyrene standards). This poly(amic acid) solution was then diluted to 3.99% solids with NMP (viscosity 22 cps, film thickness 462 angstroms at 3000 RPM spin speed).

EXAMPLE 18

Poly(amic acid) of EDDA and BAPP

In a similar manner as in Example 1, a poly(amic acid) was prepared from 6.0131 g (0.0149985 mole) BAPP, 3.8429 g (0.0149985 mole) of EDDA, and 56 ml of NMP. A moderately viscous, yellow poly(amic acid) solution resulted, which exhibited a Mw of 261,000 by GPC (UV detection, polystyrene standards). Chilling of this solution in a refrigerator resulted in a pasty, nonhomogeneous solution.

A similar reaction using an additional 40 ml of NMP resulted in a pasty solution after overnight stirring. This pasty solution did not homogenize when diluted to 10% at room temperature, but did homogenize (slight haze) when diluted and then warmed to 65° C. Once homogenized, the diluted polymer solution remained so for at least several days when stored at room temperature. The liquid crystal test cell containing this material as alignment layer and ZLI-4792 as liquid crystal mixture exhibited a tilt angle of 2.3 degrees.

EXAMPLE 19

Poly(amic acid) of EDDA, PACM-20 and (100//98/2 molar ratio)

In a similar manner as in Example 1, a poly(amic acid) was prepared from 4.3594 g (0.0207225 mole) PACM-20, 0.2225 g (0.0004230 mole) of Rf8MPD, and 5.4179 g (0.0211455 mole) of EDDA. The reaction solution did not homogenize readily so an additional 20 ml of NMP were added. Further stirring resulted in a clear solution. A somewhat viscous, nearly colorless poly(amic acid) solution resulted, which exhibited a Mw of 93,500 by GPC (IR detection, polystyrene standards). This poly(amic acid) solution was then diluted to 3.0% solids with NMP (viscosity 8 cps, film thickness 230 angstroms at 3000 RPM spin speed).

What is claimed is:

1. A polyimide alignment film for liquid crystal display devices comprising poly(2,6-piperazinedione) structural units of the formula

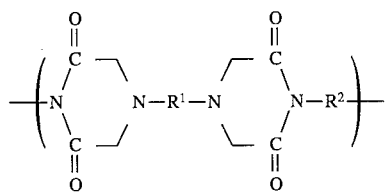

wherein $R^1$ is an alkylene group containing from 1 to 12 carbon atoms wherein up to two carbon atoms can be replaced by —O—, —S—, —CO—, —COO—, —OCO— or —CH=CH—, a 1,4-cyclohexylene group or a 1,4-phenylene group; and wherein R2 is a divalent radical of an aromatic diamine selected from the group consisting of p-phenylenediamine, m-phenylenediamine, 4,4'-diamino-diphenylmethane, 2,2-bis(4-aminophenyl)propane, 2,2-bis(4-aminophenyl)hexafluoropropane, 4,4'-diaminodiphenylsulfone, 4,4'-diaminobenzophenone, m-xylenediamine, p-xylenediamine, 1,3-bis(4-aminophenoxy)-benzene, 1,4-bis(4-aminophenoxy)benzene, 2,2-bis(4-( 4-aminophenoxy)phenyl)propane, 2,2-bis(4-(4-aminophenoxy)-phenyl)hexafluoropropane, 4,4'-bis(4-aminophenoxy)-diphenylsulfone, 4,4'-diaminobenzanilide, benzidine, 1,5-diaminonaphthalene, 3,3'-dimethylbenzidine and 3,3'-dimethoxybenzidine; or wherein $R^2$ is a divalent radical of an alicyclic diamine selected from the group consisting of 1,4-diaminocyclohexane, 1,3-diaminocyclohexane, 4,4'-diaminodicyclohexylmethane, 4,4'-diamino-3,3'-dimethyldicyclohexylmethane, 4,4'-diaminodicyclohexylsulfone and 4,4'-diaminodicyclohexyl ether.

2. The polyimide alignment film of claim 1 wherein

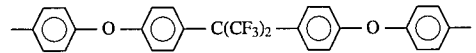

3. The polyimide alignment film of claim 1 wherein $R^1$ is —(CH$_2$)$_2$— and $R^2$ is

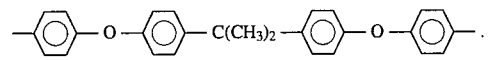

4. The polyimide alignment film of claim 1 wherein $R^1$ is —$(CH_2)_2$— and $R^2$ is

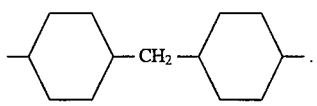

5. A polyimide alignment film for liquid crystal display devices comprising poly(2,6-piperazinedione) structural units of the formula

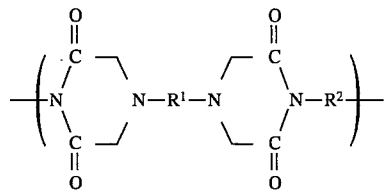

wherein $R^1$ is an alkylene group containing from 1 to 12 carbon atoms wherein up to two carbon atoms can be replaced by —O—, —S—, —CO—, —COO—, —OCO— or —CH=CH—, a 1,4-cyclohexylene group or a 1,4-phenylene group; and wherein $R^2$ is a divalent radical of an aromatic diamine selected from the group consisting of p-phenylenediamine, m-phenylenediamine, 4,4'-diaminodiphenylmethane, 4,4'-diaminodiphenyl ether, 3,4'-diaminodiphenyl ether, 2,2-bis(4-aminophenyl)propane, 2,2-bis(4-aminophenyl)hexafluoropropane, 4,4'-diaminodiphenylsulfone, 4,4'-diaminobenzophenone, m-xylenediamine, p-xylenediamine, 1,3-bis(4-aminophenoxy)-benzene, 1,4-bis(4-aminophenoxy)benzene, 2,2-bis(4-(4-aminophenoxy)phenyl)propane, 2,2-bis(4-(4-aminophenoxy)-phenyl)hexafluoropropane, 4,4'-bis(4-aminophenoxy)-diphenylsulfone, 4,4'-diaminobenzanilide, benzidine, 1,5-diaminonaphthalene, 3,3'-dimethylbenzidine and 3,3'-dimethoxybenzidine; or wherein $R^2$ is a divalent radical of an alicyclic diamine selected from the group consisting of 1,4-diaminocyclohexane, 1,3diaminocyclohexane, 4,4'-diaminodicyclohexylmethane, 4,4'-diamino-3,3'-dimethyl-dicyclohexylmethane, 4,4'-diaminodicyclohexylsulfone and 4,4'-diaminodicyclohexyl ether; and, additionally, wherein $R^2$ is a divalent radical of an alkyl or perfluoroalkyl group containing aromatic diamine comonomer selected from the group consisting of 5-perfluorohexyl-1,3-phenylene diamine, 5-perfluorooctyl-1,3-phenylene diamine, 5-perfluorodecyl-1,3-phenylene diamine, 2-perfluorohexyl-4,6-diaminomesitylene, 2-perfluorooctyl-4,6-diaminomesitylene, 1-[2,2-bis(trifluoromethyl)-3,3,4,4,5,5,5-heptafluoropentyl]-3,5-diaminobenzene, 4-(1,1,11-trihydroperfluoroundecyloxy)-1,3-phenylene diamine, 3,5-diamino-1H,1H,2H,2H-heptafluorodecylbenzoate, 3,5-diaminodecylbenzoate and 3,5-diaminohexadecylbenzoate.

6. The polyimide alignment film of claim 5 comprising from 90 to 99 mole % of said aromatic or alicyclic diamine and from 1 to 10 mole % of said aromatic diamine comonomer.

7. The polyimide alignment film of claim 5 wherein the aromatic diamine comonomer is 5-perfluorooctyl-1,3-phenylene diamine.

8. The polyimide alignment film of claim 5 wherein the aromatic diamine comonomer is 5-perfluorodecyl-1,3-phenylene diamine.

9. The polyimide alignment film of claim 5 wherein $R^1$ is —$(CH_2)_2$— and $R^2$ comprises 4,4'-diaminodiphenyl ether and 5-perfluorooctyl-1,3-phenylene diamine.

10. The polyimide alignment film of claim 5 wherein $R^1$ is —$(CH_2)_2$— and $R^2$ comprises 4,4'-diaminodiphenyl ether and 5-perfluorodecyl-1,3-phenylene diamine.

11. A liquid crystal display device comprising:
(a) a liquid crystal layer with opposite sides;
(b) a set of electrodes on either side of said liquid crystal layer; and
(c) a polyimide alignment film layer, between each set of electrodes and said liquid crystal layer, comprising poly(2,6-piperazinedione) structural units of the formula

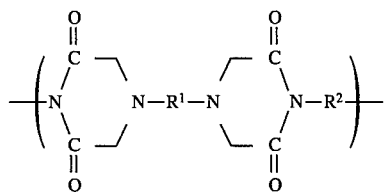

wherein $R^1$ is an alkylene group containing from 1 to 12 carbon atoms wherein up to two carbon atoms can be replaced by —O—, —S—, —CO—, —COO—, —OCO— or —CH=CH—, a 1,4-cyclohexylene group or a 1,4-phenylene group; and wherein R2 is a divalent radical of an aromatic diamine selected from the group consisting of p-phenylenediamine, m-phenylenediamine, 4,4'-diaminodiphenylmethane, 4,4'-diaminodiphenyl ether, 3,4'-diaminodiphenyl ether, 2,2-bis(4-aminophenyl)propane, 2,2-bis(4-aminophenyl)hexafluoropropane, 4,4'-diaminodiphenylsulfone, 4,4'-diaminobenzophenone, m-xylenediamine, p-xylenediamine, 1,3-bis(4-aminophenoxy)-benzene, 1,4-bis(4-aminophenoxy)benzene, 2,2-bis(4-(4-aminophenoxy)phenyl)propane, 2,2-bis(4-(4-aminophenoxy)-phenyl)hexafluoropropane, 4,4'-bis(4-aminophenoxy)-diphenylsulfone, 4,4'-diaminobenzanilide, benzidine, 1,5-diaminonaphthalene, 3,3'-dimethylbenzidine and 3,3'-dimethoxybenzidine; or wherein $R^2$ is a divalent radical of an alicyclic diamine selected from the group consisting of 1,4-diaminocyclohexane, 1,3-diaminocyclohexane, 4,4'-diaminodicyclohexylmethane, 4,4'-diamino- 3,3'-dimethyldicyclohexylmethane, 4,4'-diaminodicyclohexylsulfone and 4,4'-diaminodicyclohexyl ether; and, additionally, wherein $R^2$ is a divalent radical of an alkyl or perfluoroalkyl group containing aromatic diamine comonomer selected from the group consisting of 5-perfluorohexyl-1,3-phenylene diamine, 5-perfluorooctyl-1,3-phenylene diamine, 5-perfluorodecyl-1,3-phenylene diamine, 2-perfluorohexyl-4,6-diaminomesitylene, 2-perfluorooctyl-4,6-diaminomesitylene, 1-[2,2-bis(trifluoromethyl)-3,3,4,4,5,5,5-heptafluoropentyl]-3,5-diaminobenzene, 4-(1,1,11-trihydroperfluoroundecyloxy)-1,3-phenylene diamine, 3,5-diamino-1H,1H,2H,2H-heptafluorodecylbenzoate, 3,5-diaminodecylbenzoate and 3,5-diaminohexadecylbenzoate.

12. The liquid crystal display device of claim 11 containing a polyimide alignment film wherein $R^2$ comprises from 90 to 99 mole % of said aromatic or alicyclic diamine and from 1 to 10 mole % of said aromatic diamine comonomer.

13. The liquid crystal display device of claim 12 wherein said aromatic diamine comonomer is 5-perfluorooctyl-1,3-phenylene diamine.

14. The liquid crystal display device of claim 12 wherein said aromatic diamine comonomer is 5-perfluorodecyl-1,3-phenylene diamine.

15. The liquid crystal display device of claim 11 wherein the liquid crystal layer comprises a mixture of at least one compound of the formula

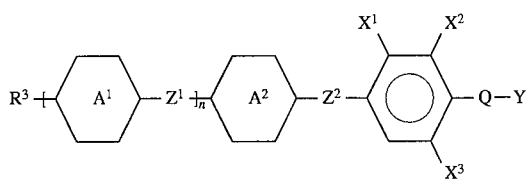

wherein $R^3$ is an alkyl group containing from 1 to 12 carbon atoms wherein, in addition, one or two non-adjacent —$CH_2$— groups can be replaced by —O—, —CO—, —COO—, —OCO— or —CH=CH—;

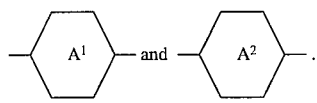

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene, or one of

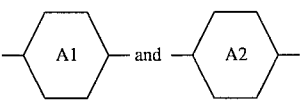

is alternatively pyrimidine-2,5-diyl, pyridine-2,5-diyl or trans-1,4-dioxane-2,5-diyl;

$Z_1$ and $Z_2$, independently of one another, are a direct bond, —$CH_2CH_2$—, —COO—, —OCO— or —C≡C—;

$X^1$, $X^2$ and $X^3$, independently of one another, are H or F;

Q is —$CF_2$—, —$OCF_2$—, —$C_2F_4$— or a direct bond;

Y is H, F, Cl or CN; and n is 0, 1 or 2.

* * * * *